United States Patent [19]

Shoner

[11] 3,730,194

[45] May 1, 1973

[54] METHODS OF AND COMPOSITIONS FOR STRIPPING RUBBER ARTICLES ADHERED TO A SUBSTRATE

[76] Inventor: Marshall M. Shoner, 12244 S. Truro, Hawthorne, Calif. 90250

[22] Filed: Jan. 24, 1972

[21] Appl. No.: 220,481

Related U.S. Application Data

[63] Continuation-in-part of Ser. No. 791,787, Jan. 16, 1969, abandoned.

[52] U.S. Cl. ..........................134/41, 134/3, 134/38, 134/42, 252/143
[51] Int. Cl. ..........C11d 7/50, C11d 7/08, B08b 3/08
[58] Field of Search........................134/3, 38, 41, 42; 252/143; 260/711, 719

[56] References Cited

UNITED STATES PATENTS

| | | |
|---|---|---|
| 300,720 | 6/1884 | Mitchell ..............................260/711 |
| 1,279,332 | 9/1918 | Gravell....................................134/3 |
| 1,545,498 | 7/1925 | Klinger et al.........................138/6.21 |
| 1,695,430 | 12/1928 | Klinger.............................252/143 X |
| 2,052,997 | 9/1936 | Bezzenberger..........................134/3 |
| 2,852,471 | 9/1958 | Atkins et al. ......................134/38 X |
| 3,335,088 | 8/1967 | Mandell ..............................252/143 |

FOREIGN PATENTS OR APPLICATIONS

| | | |
|---|---|---|
| 730,958 | 6/1955 | Great Britain............................134/3 |
| 834,707 | 5/1960 | Great Britain..........................134/38 |

OTHER PUBLICATIONS

The Vanderbilt Rubber Handbook; R. T. Vanderbilt Co., N.Y.; 1958; pp. 238 & 239.

*Primary Examiner*—Barry S. Richman
*Attorney*—Le Roy J. Leishman

[57] ABSTRACT

Rubber articles adhered to a metal or plastic object by a commercial bonding agent can be removed by immersion in stripping solutions. For nitrile rubber articles, the solution consists of between 15 ml and 20 ml of hydrofluoric acid and between 150 ml and 170 ml of nitric acid in a gallon of acetone. For silicone rubber articles, the solution consists of hydrofluoric acid, sulfuric acid, in a ratio of 6:5, in acetone with a total of from 45 ml to 65 ml of combined HF and $H_2SO_4$ for each gallon of acetone. These solutions attack the bond between the rubber and bonding agent. Effective stripping is achieved by immersing the object in the solution at room temperature for a few hours or less. The solutions will not damage an anodized surface.

8 Claims, No Drawings

METHODS OF AND COMPOSITIONS FOR STRIPPING RUBBER ARTICLES ADHERED TO A SUBSTRATE

RELATED APPLICATION

This application is a continuation-in-part of the copending application, Ser. No. 791,787 filed Jan. 16, 1969 and now abandoned.

BACKGROUND OF THE INVENTION

1. Field of the Invention.

The present invention relates to methods for stripping a rubber article from a substrate to which the article has been adhered by a commercial bonding agent, and to stripping solutions employed for this purpose.

2. Description of the Prior Art.

In the aerospace and other industries it is common to employ metal or plastic components to which rubber gaskets, O-rings or other rubber articles have been attached. For example, the drive shafts of penumatic tools may utilize nitrile or silicone rubber gaskets to prevent leakage along the shaft of air under high pressure. The rubber article often is adhered to the substrate by a commercial bonding agent and may be situated in a groove or recess.

Occasionally during the manufacture of such components the rubber gasket is damaged, resulting in rejection of the entire component. Since the metal substrate often is worth far more than the gasket itself, it becomes advantageous to salvage the component. For the same reason it is desirable to salvage used components after the gaskets have become worn or damaged. This necessitates removal of the damaged gasket for replacement by one without flaws.

The salvaging operation is difficult since the bonding agent forms a very tenacious grip on the gasket or rubber article. Mechanical removal, as by scraping, is not recommended since this may nick or gouge the surrounding metal, making it difficult to maintain an effective seal even with a new gasket.

Chemical removal of the damaged rubber article is preferable. Several problems are encountered. First, the solution used must effectively strip the rubber, preferably by breaking down the bond with the commercial bonding agent. Stripping at room temperature is preferred, as is a relatively short immersion period such as a few hours. The solution should not damage the substrate, as by degrading an anodized surface. Finally, the stripping solutions should be low in cost. An object of the present invention is to provide such stripping solutions, which have not been available in the past.

SUMMARY OF THE INVENTION

Stripping solutions satisfying the foregoing objective are disclosed herein. For stripping nitrile rubber articles the solution advantageously consists of hydrofluoric acid, nitric acid and acetone, there being between 15 ml and 20 ml of hydrofluoric acid and between 150 ml and 170 ml of nitric acid for each gallon of acetone. For stripping silicone rubber articles, the solution preferably consists of hydrofluoric acid, sulfuric acid and acetone, the ratio of HF to $H_2SO_4$ in the solution being 6:5, there being a total of between 45 ml and 65 ml of combined HF and $H_2SO_4$ for each gallon of acetone. In each instance, commercial grade acids are used.

The foregoing solvents are effective in breaking down the bond between the rubber article and the bonding agent. Immersion of the substrate and adherent article in the solvent at room temperature for a period of a few hours is sufficient to achieve stripping without degradation of the substrate surface.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention is best defined by the appended claims.

Nitrile rubber articles such as gaskets, O-rings and the like may be attached to a substrate by a commercial bonding agent such as Lord BN, a product of Lord Chemical Company; Chemlock 205 bonding agent with Chemlock 220 second coat, both products of Hughson Chemical Company, or Thixon AN2, a product of Whitaken Corporation. Such bonding agents are effective in adhering nitrile rubber to metal, including anodized aluminum, or to plastic.

It has been found that such bonded nitrile rubber articles can be stripped from the substrate using a solution consisting of hydrofluoric acid (HF), nitric acid ($HNO_3$) and acetone ($CH_3COCH_3$). Preferably the hydrofluoric acid is of industrial or commercial grade, consisting of 52 percent hydrofluroic acid in water. The nitric acid likewise is of industrial or commercial grade, having a density value of 38° Baume.

For most effective stripping at room temperature and without degradation of the substrate surface, it is important that the solution contain between 15 ml and 20 ml of commercial grade hydrofluoric acid and between 150 ml and 170 ml of commercial grade nitric acid for each gallon of acetone.

To strip a nitrile rubber article from a metal or plastic component, the component is immersed in the solution just described. The stripping solution, which is operative at room temperature, appears primarily to break down the bond between the rubber and the bonding agent. The rubber itself does not appear to break down, rather the article "pops" loose from the substrate. Some residual bonding agent may remain adhered to the substrate, also indicating that the solution does not operate primarily at the bonding agent-substrate interface. The capability to attack the rubber-bonding agent interface appears to be a synergistic effect of using both hydrofluoric acid and nitric acid in the solution. For most articles, effective stripping is achieved with immersion of less than about 2 hours. During this time the relative concentrations of the solution ingredients does not change appreciably.

By way of example, the solution was used to strip nitrile rubber gaskets from an anodized aluminum component. The gaskets were approximately three-sixteenths inch thick and were situated in a cavity of about 0.100 inches deep and having a width of about 0.150 inches. The gaskets were adhered to the aluminum substrate by the commercial bonding agent Lord BN which was initially baked onto the substrate. The component was immersed in the above described stripping solution, at room temperature, for a duration of about 45 minutes. As the solution broke down the bond between the gasket and the bonding agent, portions of the gasket would pop loose from the substrate. At the end of 45 minutes the component was removed from the solution. The rubber gasket easily could be lifted from the substrate. Some residual bonding agent remained on the substrate, which was readily cleaned for application of a new gasket. Immersion in the stripping solution did not at all degrade the anodized surface of the component.

The range of hydrofluoric acid and nitric acid concentration in the solution appeared to be important. If either acid were omitted from the solution, the bond breakdown described would not occur. When the nitric acid concentration is increased above about 170 milliliters per gallon of acetone, some anodized surface degradation is experienced. Similarly, when the HF concentration is increased above 20 ml, the solution attacks an anodized surface immersed in the solution for many hours. On the other hand, reduction of the nitric acid concentration below about 150 ml, significantly slows down the stripping process. When the example described above was repeated using a solution with only 130 cc of nitric acid per gallon of acetone (with 15 ml of HF), the effective stripping time was slowed down from about 45 minutes to about 2 hours.

The inventive nitrile rubber stripping solution is very inexpensive, and can be manufactured for less than $2.00 per gallon.

For stripping silicone rubber articles from a plastic or metal object, it has been found that a solution consisting of hydrofluoric acid (HF), sulfuric acid ($H_2SO_4$) and acetone ($CH_3COCH_3$) is effective. Preferably the hydrofluoric acid is of industrial or commercial grade, consisting of about 52 percent hydrofluoric acid in water. The sulfuric acid also is of industrial or commercial grade, and has a density value of 66° Baume. The preferred ratio of HF to $H_2SO_4$ in the solution is 6:5, with the total concentration of combined HF and $H_2SO_4$ being between 45 milliliters and 60 milliliters for each gallon of acetone.

A stripping solution as just described is effective in breaking the bond between a silicone rubber article and a commercial bonding agent such as Dow A4040, a product of Dow Chemical Corporation; Chenlock 607, a product of Hughson Chemical Company; or Dow Corning 5050, another product of Dow Chemical Corporation. Effective stripping is accomplished by immersion in the solution, at room temperature, for less than about 2 hours. As with the nitrile rubber stripping solution discussed above, the combined use of two acids appears to have a synergistic effect in breaking the bond between the rubber and the bonding agent. The described solution does not degrade an anodized surface, but degradation will occur if the concentration of either HF or $H_2SO_4$ is increased significantly above the range described. Decreasing the concentration of either ingredient slows down the stripping time. The solution is inexpensive.

An object which has been stripped with the inventive solutions can be cleaned by an acetone rinse followed by a water rinse. The used solution, which eventually will become contaminated by chemicals drawn out from the rubber being stripped, can be diluted with water and a detergent to reduce the pH sufficiently to allow sewer disposal.

Intending to claim all new and unobvious features shown or described, the applicant claims:

1. A solution for stripping a nitrile rubber article from an object to which the article has been adhered by a commercial bonding agent, said solution consisting of a commercial grade of hydrofluoric acid comprising 52 percent hydroflouric acid in water, nitric acid and acetone, there being between 15 milliliters and 20 milliliters of hydrofluoric acid and between 150 milliliters and 170 milliliters of nitric acid for each gallon of acetone in said solution, and wherein said nitric acid is of commercial grade and has a density value of 38° Baume.

2. A solution according to claim 1 wherein said bonding agent is a member of the group consisting of Lord BN; Chemlock 205 primer with Chemlock 220 a second coat; and Thixon AN2.

3. The method of stripping a nitrile rubber article from a metal object having an anodized surface consisting of:
   a. immersing said object in a solution according to claim 1, and
   b. continuing said immersion until said article has separated from said object, said immersion leaving said anodized surface uneffected.

4. The method of claim 3 wherein said solution is maintained at room temperature and wherein said immersion is for a period of less than about 2 hours.

5. A solution for stripping a silicone rubber article from an object to which the article has been adhered by a commercial bonding agent, said solution consisting of hydrofluoric acid (HF), sulfuric acid ($H_2SO_4$) and acetone ($CH_3COCH_3$), the ratio of HF to $H_2SO_4$ in said solution being 6:5, there being a total of between 45 milliliters and 65 milliliters of combined HF and $H_2SO_4$ for each gallon of acetone, said hydrofluoric acid being of a commercial grade consisting of 52 percent hydrofluoric acid in water, and said sulphuric acid is of a commercial grade having a density value of 66° Baume.

6. A solution according to claim 5 wherein said bonding agent is a member of the group consisting of Dow A4040; Chemlock 607; and Dow-Corning 5050.

7. A method of stripping a silicone rubber article from a metal object having an anodized surface, consisting of:
   a. immersing said article in a solution according to claim 5, and
   b. continuing said immersion until said article has separated from said object, said immersion leaving said anodized surface uneffected.

8. The method of claim 7 wherein said solution is maintained at room temperature and wherein said immersion is for a period of less than about 2 hours.

* * * * *